United States Patent

[11] 3,604,807

| [72] | Inventor | Edwin B. Champagne<br>Ann Arbor, Mich. |
|------|----------|--------|
| [21] | Appl. No. | 3,083 |
| [22] | Filed | Jan. 15, 1970 |
| [45] | Patented | Sept. 14, 1971 |
| [73] | Assignee | GCOptronics, Inc.<br>Ann Arbor, Mich. |

[54] METHOD AND APPARATUS FOR HOLOGRAPHIC REAL TIME VELOCITY MEASUREMENT
9 Claims, 2 Drawing Figs.

[52] U.S. Cl. ................................................. 356/28, 356/106
[51] Int. Cl. ........................................................ G01p 3/36
[50] Field of Search ............................................. 356/28, 106; 340/5 H; 350/3.5; 73/194

[56] References Cited
OTHER REFERENCES

Foreman, Jr. et al; " Laser Doppler Velocimeter for Measurement of Localized Flow Velocities in Liquids;" Proc. IEEE; 3-1966; pp. 424, 425

El-sum, " Uses for Holograms," Science & Technology, 11-1967, pp. 50– 59,83

*Primary Examiner*—Rodney D. Bennett, Jr.
*Assistant Examiner*—S. C. Buczinski
*Attorney*—Barnard, McGlynn and Reising ABSTRACT: Method and apparatus are disclosed for measuring the velocity of a material using the techniques of holography in conjunction with measurement of a doppler shift frequency enabling the velocity at multiple points to be determined without the need for reestablishing an interferometric system. A hologram is made of a material in a static condition in a test zone. Motion of a test material in the zone is then initiated and the hologram is reilluminated in the same manner as in real time interferometry. A lens system images a point in the test zone onto a photocell and the light scattered from the focal volume is imaged in the photocell and additionally the wave front produced by the hologram is imaged in the photocell. Thus, two fields are superposed on the photocell and a mixing action takes place between one of the fields which is doppler shifted in frequency by the velocity and the other which retains the frequency of the reference beam. Thus the photocell produces an output signal equal to the doppler shift frequency which is proportional to a component of velocity in a known direction.

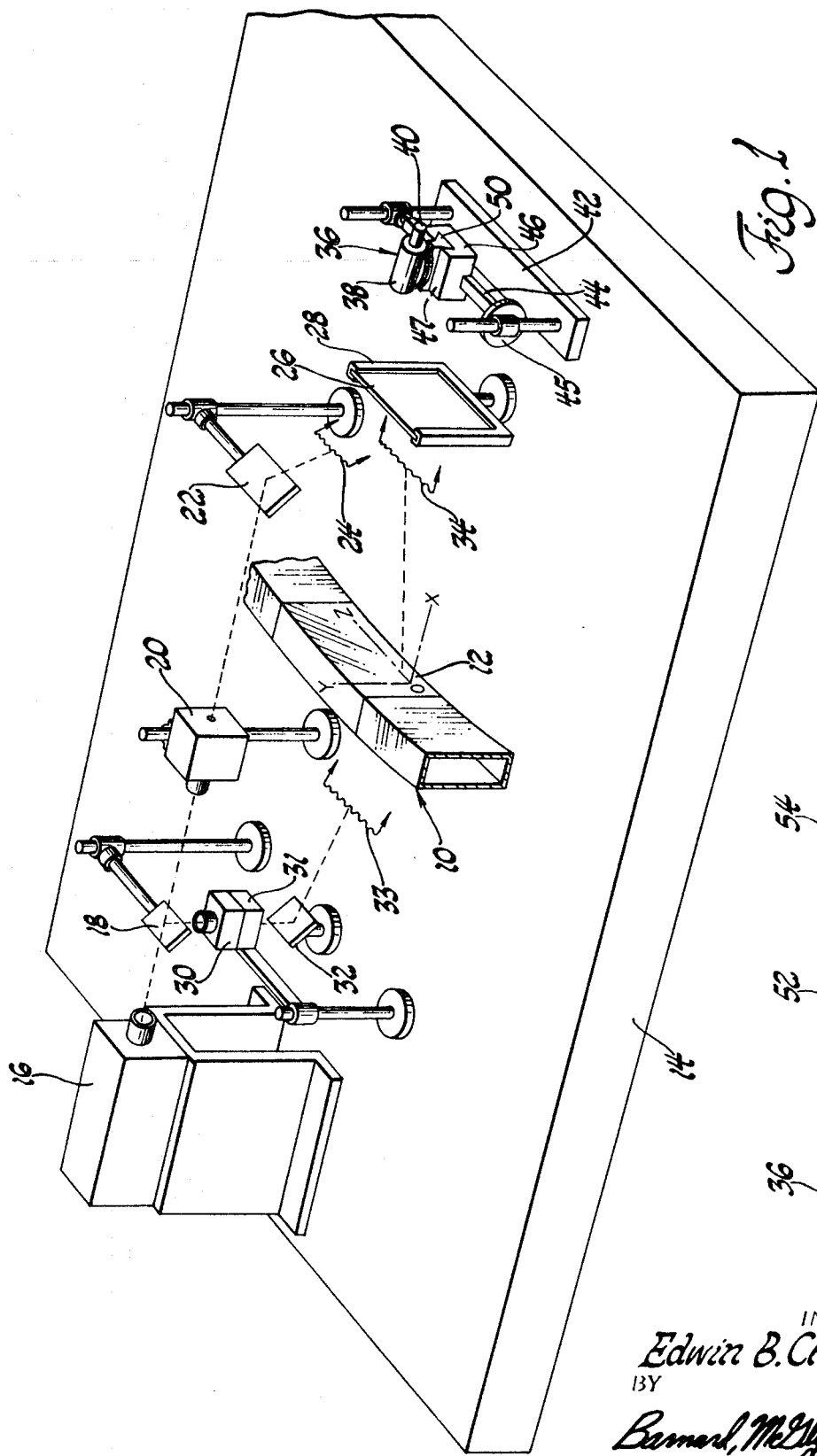

METHOD AND APPARATUS FOR HOLOGRAPHIC REAL TIME VELOCITY MEASUREMENT

This invention relates to apparatus for measuring the velocity of a material and, more particularly, to such apparatus utilizing holographic techniques.

There has been a need for a new technique for measuring velocity of a material, such as the flow at any selected point in a flow volume which will afford great precision, speed and ease of operation and simplicity of equipment required. Such a technique, of course, in order to provide the requisite accuracy must not disturb the flow volume in any way. There are many applications for such a velocity measuring technique including studies of aerodynamic systems, hydraulic systems, gas flow, motion of solid materials and the like.

It is already known to measure the flow rate of a fluid utilizing the doppler shift in frequency of light scattered by a flowing substance. Measurements using this principle together with the techniques of interferometry have become practical in recent years with the availability of the laser as a source of coherent radiation. In this technique the laser beam is split into two paths with one path being transmitted through or reflected from the flow zone of the fluid and thereby subjected to a doppler shift in the frequency of the emerging beam. The doppler shift is dependent upon the flow rate or component thereof in the plane of the illumination beam and the observation beam which is caused to impinge upon a photo detector. In the other path the laser beam impinges directly upon the photo detector and hence the frequency thereof remains unchanged. The wavefronts of the two beams interfere on the photo detector and a signal varying at the doppler frequency is produced thereby. Measurement of the signal frequency from the photo detector permits a determination of one component of the flow rate. In order to map the flow rate for a given volume or surface the lens may be refocused on a multiplicity of points in the flow zone with a frequency measurement for each point as a determination of the flow rate. The difficulty with this technique is that the movement of the detector from point to point requires the establishment of an interferometer set up at each point and, as is well known, this is a very time-consuming and tedious procedure. Alternatively, this doppler shift interferometric arrangement might employ a very large number of detectors to avoid the need for relocating a single detector but the difficulty with this is that the instrumentation set up becomes difficult and the equipment is complex.

Accordingly, it is desired to provide a velocity measurement technique with which a measurement may be made at any point with great accuracy and speed and without the complication of multiple detectors or establishing multiple interferometric setups. This is accomplished in accordance with this invention by utilizing the measurement of the doppler shift in the radiation scattered from the test zone together with the techniques of holography. More particularly, the technique utilizes the combination of the doppler shift principle in combination with the techniques of real time interferometry. This is accomplished by making a hologram of a material in the flow zone with the material being effectively stationary and then initiating motion of a test material through the test zone and simultaneously illuminating the hologram and the test zone in such relative positions that the image produced by the hologram is superimposed on the test zone. Consequently, the illumination beam is scattered by the material in the test zone and emerges therefrom as an observation beam which is doppler shifted in frequency as a result of the motion of the material. The wavefront of the observation beam scattered from a selected part of the material is mixed with the wavefront reconstructed by the hologram and the frequency of variation of the interference pattern produced by the wavefronts is measured to determine the doppler shift and hence the velocity of the selected part of the material. More specifically, in the measurement of the doppler shift frequency a lens and photocell are disposed behind the hologram and an image of the selected part of the material and the image reconstructed by the hologram are produced on the photocell thereby producing an output signal having a frequency corresponding to the doppler shift of the observation beam. Then the lens and photocell may be disposed in another position behind the hologram to select another part of the material in the test zone for measurement in the same manner. By this technique of utilizing the hologram of the test zone in a static condition, the lens-photocell system may be relocated at will to focus on other selected parts of the material in the test zone without realignment of the interferometer.

A more complete understanding of this invention may be obtained from the detailed description which follows taken with the accompanying drawings in which:

FIG. 1 of the drawing represents the velocity measuring apparatus of this invention.

FIG. 2 represents an arrangement of the detecting circuitry.

As is well known, holography is an image forming process in which a wavefront interference pattern is recorded and wavefront reconstruction therefrom is utilized to produce an image of a three-dimensional object. In making a hologram the object is illuminated with a beam of coherent wave energy and the wavefront reflected therefrom and a reference wavefront are superposed and recorded. The reflected wavefront alone lends intensity distribution to the recorded information and the reference wavefront lends phase information. The reference wavefront and the object wavefront taken together and superposed in the space occupied by the recording medium produced an interference pattern comprising fringe lines in the nature of a diffraction grating. It is common practice to use a laser as the source of coherent electromagnetic energy at optical wavelengths with a receiver or recording medium in the form of a photographic plate with a high-resolution photographic emulsion. In order to reconstruct the wavefront to form a three-dimensional image of the object, the hologram is illuminated by a wavefront identical to that of the reference wavefront. Diffraction at the hologram recreates the object wavefront. Because of the presence of both intensity information and phase information in the object wavefront, an observer looking through the hologram sees an image in three-dimensions of the original object.

It is well known that if two beams of light or other electromagnetic energy which are spatially and temperally coherent are of the same wavelength and intersect at a small angle, parallel fringe lines are produced in the region of the intersection. If the two beams are of equal frequency than the fringe lines appear to be stationary. On the other hand, if one of the beams has a frequency slightly different from that of the other the fringe lines appear to move in a plane approximately normal to the intersecting beams at a rate proportional to the difference between the frequencies. This phenomenon is used in the present invention for heterodyning two waves of different frequencies and for obtaining an output signal corresponding to the difference in frequencies.

When a beam of electromagnetic energy or radiation such as light impinges upon a reflective body which is stationary with reference to the source, the reflected beam has the same frequency as the impinging beam. On the other hand if the reflective body is in motion with reference to the source the frequency of the reflected beam differs from the frequency of the impinging beam by an amount proportional to the velocity of the body which is known as the doppler shift frequency. The frequency of the reflected beam will be increased or decreased in accordance with the direction of motion of the reflective body with reference to the source. In general, the change in frequency varies directly with the component of the velocity of the body along the bisector of the illumination and observation directions, the cosine of the half-angle between the illumination and the observation directions and with the ratio of the frequency of the source to the speed of light. In the case where the reflective body is a fluid, such as a gas or liquid, the impinging beam will be reflected from a large number of scattering centers, each of which is movable with its associated part of the fluid and hence movable with respect to each other. Such scattering centers may take a wide variety of form including minute irregularities in the surface of a liquid or minute inclusions or particles suspended in a fluid. Thus, in considering a fluid in motion any discrete part thereof, either a surface area or a flow volume may be regarded as a reflective body in motion because it produces a doppler shift in the frequency of a beam of light impinging thereon. The fluid may be an opaque material in which case surface flow rates may be determined by measuring the doppler shift frequency or the fluid may be transparent in which either surface or volume flow rates may be determined by measuring the doppler shift frequency of a selected part of the fluid.

In real time holographic interferometry interference occurs between the wavefronts wavefront reconstructed the image and from the object. The wavefront from the image is reconstructed by using the hologram in the same position as when it was recorded, and the object is simultaneously illuminated by the illumination beam. Thus, the reconstructed wavefront of the image is superposed on the wavefront of the object. Whenever the object is slightly deformed or displaced, interference fringe lines between the wavefronts are produced and are observable at the same time. If the object is not deformed or displaced but instead the reference beam frequency is doppler shifted by reason of motion of the object, then the wavefront reconstructed by the hologram interferes with the wavefront which is reflected from the object and passes directly through the hologram. This interference of the wavefronts of beams of two different frequencies, as discussed above, appears as fringe lines moving at a rate proportional to the difference of the frequency.

Referring now to the drawings, there is shown an illustrative embodiment of the invention in a system for measuring the flow rate of a fluid in a conduit 10. The conduit may be of any desired configuration depending upon the type of flow study to be made. Although the invention will be described with reference to measuring flow rate in a flow volume of a transparent liquid, it will be appreciated as the description proceeds that the test material may be liquid, gas, particulate material, or a rigid body of material; velocity or a component thereof may be determined at the surface of any material or in the interior of a transparent material. The conduit 10 adapted to convey a test liquid is supported upon a stable optical table 14 and provided with a suitable transparent window for access to a test zone 12 in which measurements are to be made on the test fluid.

It is to be noted that in a selected test zone of a fluid there may be a variation of the velocity from point to point depending upon the configuration of the flow path in the general vicinity of the test zone. Thus, for the measurement of velocity or flow rate which requires a determination of both magnitude and direction of the velocity vector, it is convenient to establish a coordinate axis system with reference to which the measurements may be made. For this purpose there is illustrated an orthogonal coordinate axis system comprising the X, Y and Z axes having an origin 0 at one boundary of the test zone. In the illustrative embodiment of the invention for which the apparatus is shown in the drawings, flow rate measurements are to be made of that component of velocity or flow rate in a plane defined by the illumination and the observation directions.

In accordance with the invention the measurement of flow rate is accomplished in a two-step process wherein the first step includes making a hologram of the test zone and the second step includes the use of the hologram for measuring the doppler shift frequency produced by a selected part of the material in the test zone. The two steps of the overall measurement process may be carried out using apparatus of the type shown in the drawings.

The hologram of the test zone 12 is to be used to represent the body of fluid therein in a static or nonflow condition. For this purpose, the hologram can be made of the test fluid in the test zone before flow is initiated, and for certain fluids this would be quite satisfactory. However, the hologram should for best results reconstruct the wavefronts from a large number of scattering centers in the test zone. Therefore, it is preferred to fill the test zone with a stationary material which provides a large number of scattering centers such as a colloidal suspension. A suitable fluid material is a milky fluid such as that made by mixing cows milk and water. Alternatively, the hologram can be made with the test fluid in a flowing condition provided that the exposure time in making the hologram is small with respect to significant displacement of the scattering centers.

In the illustrative embodiment the apparatus is adapted to produce the hologram with the test zone filled with a fluid material such as milky water in a static condition and which provides a large number of scattering centers. The apparatus includes a laser 16 on the table 14 as a source of coherent waves. The laser is suitably a helium neon gas laser operated in a continuous wave mode at a wavelength of 6,328 angstroms. The output beam of the laser is directed upon the beam splitter 18 which divides the beam into two paths. One of the beam paths is adapted to produce a reference beam or wavefront 24 and extends from the beam splitter 18 through a spatial filter 20 to expand the beam and eliminate unwanted diffracted waves caused by anomalies in the optics. The spatial filter may suitably take the form of the well-known lens-pinhole arrangement in which the lens focuses the nearly collimated laser beam to a point where the pinhole spatially filters the unwanted waves. The output beam of the filter is reflected from a mirror 22 as the reference wavefront 24 onto a recording medium in the form of a photographic plate 26 which is removably supported in a plate holder 28. The photographic plate has an exceedingly high resolving power and a suitable emulsion therefore is that identified as Kodak 649-F spectroscopic plate which is available from the Eastman Kodak Company.

The other beam path from the beam splitter 18 is adapted to produce an object wavefront and includes a spatial filter 30 and a collimating lens 31 which expands and collimates the beam. The collimated beam impinges upon a reflector or mirror 32 which directs an illuminating beam 33 onto the test zone 12. The beam emerges from the test zone as an object beam 34 which impinges upon the front surface of the photographic plate 26. As is well known the object beam and the reference beam interact in the plane of the emulsion on the photographic plate and produce a wavefront interference pattern. The photographic plate records the intensity of the interference pattern which may be thought of as the superposition of virtually an infinite number of Fresnel zone plates, one for each point on the object. After a sufficient time exposure of the photographic plate, the laser beam is interrupted or turned off. The hologram is then completed by developing the photographic emulsion to produce a permanent record of the wavefront interference pattern. The hologram is then ready for use in reconstructing the wavefront produced by the fluid in the fluid zone 12. The reconstruction may be accomplished, as is well known, by illuminating the hologram with a monochromatic beam of light similar to the reference wave. Such illumination causes the reconstruction of the wavefront by diffraction of the reference beam and thus when an observer looks through the hologram he sees a virtual image of the object, in this case the fluid in the fluid zone, in three dimensions.

The next step of the process is carried out in part in a manner similar to that used in real time interferometry. The photographic plate 26, which constitutes the hologram, is repositioned with great precision in the same space it occupied when the hologram was made. With the laser beam turned on the reference beam 24 will illuminate the hologram and an observer behind the hologram and looking through the same will see the virtual image of the fluid in the fluid zone. At the same time the observer will see the fluid in the test zone 12 as it is illuminated by the illumination beam 33. With the fluid in the test zone 12 in the identical condition as it was when the hologram was made, the observer would see the fluid and the image thereof superposed thereon and there would be no discernable difference.

With the apparatus in the condition as just described the milky fluid is removed from the test zone 12 and the test fluid, the velocity of which is to be measured, is introduced into the conduit 10 with flow conditions which are to be measured. To provide for such measurement the apparatus includes a photodetector 36 which includes a lens 38 and a photocell 40. The photodetector is positioned behind the hologram and is movably mounted with respect thereto on an adjustable mount. The adjustable mount includes a support member 42 with a pair of vertical posts and a vertical carriage 44 mounted thereon for vertical movement parallel to the hologram. The carriage 44 is pivotally supported for angular adjustment about a horizontal axis by an elevation wheel 45. A cross-slide 46 is mounted on the vertical carriage 44 and adapted for horizontal movement parallel to the hologram. The cross-slide 46 is rotatably supported for angular adjustment about a vertical axis by an azimuth wheel 47. The apparatus also includes an additional cross-slide 50 on the cross-slide 46 and upon which the photodetector 36 is mounted to provide for movement toward and away from the hologram in a direction normal thereto. The output electrical signal of the photodetector 36 is applied to a frequency meter 52 as shown in FIG. 2 and if desired, the output of the frequency meter may be applied to a suitable recorder 54.

In order to make a measurement of flow rate or velocity of a selected part of the fluid in the test zone 12, the lens 38 is adjusted to produce an image of the selected part of the fluid in the test zone 12 on the active surface of the photocell 40. Additionally, the wavefront reconstructed by the hologram will be imaged on the surface of the photocell 40 and thus the photodetector will be subjected to the coherent superposition of two fields. One of the fields, which is produced from the wavefront reconstructed from the hologram, will be of a frequency equal to the reference beam, i.e., the laser beam. The other field, however, will be a wavefront produced in real time by the observation beam emerging from the first selected part of the fluid in the test zone 12; hence, it will be doppler shifted in frequency as a function of the component of velocity of the fluid in the plane of the illumination and observation beams. Accordingly, by reason of the difference of frequencies of the fields imaged upon the photocell the fringe lines produced by the interference pattern thereof will appear to move at a rate corresponding to the difference frequency or the doppler shift frequency. Thus, the photocell will produce an output signal having a frequency equal to the doppler shift frequency and directly proportional to the magnitude of the desired component of velocity. The output signal from the photodetector is applied to the frequency meter which may be calibrated in units of velocity if desired and may be applied to the recorder to obtain a permanent record of the measurement.

After the flow rate measurement is completed for the first selected part of the fluid in the test zone 12, the photodetector 36 may be repositioned by translational adjustment and the lens will image a second selected part of the fluid in the test zone 12 onto the photocell 40 and the flow rate measurement may be made as previously described.

It will now be apparent that the photodetector may be relocated to make measurements of a selected velocity component at as many points as desired without the necessity of realigning the interferometer system. It will also be apparent that all velocity components at a single point may be determined by taking additional readings at different angles of observation. For example, this may be done by obtaining measurements with the plane defined by the illumination and observation beams being disposed parallel or at a known angle to the X-Y, X-Z and Y-Z planes. Thus the velocity values for the entire field of interest may be plotted.

Although the description of this invention has been given with respect to a particular embodiment thereof, it is not to be construed in a limiting sense. Many variations and modifications will now occur to those skilled in the art. For a definition of the invention reference is made to the appended claims.

The embodiments of the invention in which an exclusive property or privilege is claimed are defined as follows:

1. The method of measuring the velocity of a selected part of a material in a test zone comprising the steps of; making a hologram of a material in said zone with the material being effectively stationary, initiating the motion of a material through said zone, illuminating said hologram and said zone with an illumination beam in such relative positions that the image produced by the hologram is superposed upon the test zone thereby producing an observation beam scattered by the material in said test zone, mixing the wavefront of the observation beam scattered from the selected part of said material with the wavefront reconstructed by the hologram, and measuring the frequency of variation of the interference pattern produced by said wavefronts.

2. The method of measuring a selected velocity component of different parts of a material in a test zone comprising the steps of making a hologram of a material in said zone with the material being effectively stationary, initiating the motion of a material through said zone, illuminating said hologram and said test zone in such relative positions that the image produced by the hologram is superposed upon the test zone thereby producing a doppler-shifted observation beam scattered by the material in said test zone, producing on a photocell, for successively selected different parts of said material superposed fields representing the selected part and the image reconstructed by said hologram thereby producing a photocell output having a frequency corresponding to the doppler-shift of said observation beam, and measuring the output frequency for the successively selected different parts of said material to determine the component velocity thereof.

3. The method of measuring the flow rates in a given direction of different parts of a fluid in a test zone comprising the steps of making a hologram of a material in said test zone with the material being effectively stationary, initiating the flow of said fluid through said zone, illuminating said hologram and said test zone in such relative positions that the virtual image produced by the hologram is superposed upon the test zone thereby producing a doppler-shifted observation beam scattered by the fluid in said zone, disposing a lens and photocell in a position behind said hologram with the image of a first selected part of the fluid and the image reconstructed by the hologram being produced by the lens on said photocell thereby producing a photocell output signal having a frequency corresponding to the doppler-shift of said observation beam, measuring the output frequency of the photocell to determine the flow rate of first one selected part of the fluid, and disposing said lens and photocell in another position behind said hologram with the image of a second selected part of the fluid and the image reconstructed by the hologram being produced by the lens on said photocell thereby producing a photocell output having a frequency corresponding to the doppler-shift of said observation beam, and measuring the output frequency of the photocell to determine the flow rate of said second selected part of the fluid.

4. Apparatus for measuring the velocity of a selected part of a material in a test zone comprising a hologram of an effectively stationary material in said zone, a source of a coherent illumination beam for illuminating the material in said flow zone, said beam being adapted upon illumination of said hologram to reconstruct an image of the stationary material in said zone, the hologram, and test zone being disposed in such relative positions that the image produced by the hologram is superposed on said test zone, the illumination beam impinging upon the material in the test zone and being reflected thereby as a doppler-shifted observation beam, detector means movably disposed behind the hologram adapted to receive the illumination beam through the hologram and the observation beam, the frequency measuring means connected with the photocell.

5. The invention defined in claim 4 wherein said hologram is a photographic plate, said detector means includes a photocell and a lens, and said source is a laser.

6. The invention defined in claim 5 wherein the effectively stationary material is a milky liquid in a nonflowing condition in said test zone.

7. The invention defined in claim 5 wherein said test zone is three-dimensional, said fluid is at least partially transparent to said illumination beam and said illumination beam passes through the fluid in said test zone.

8. The invention defined in claim 5 wherein said lens and photocell are supported for translational and angular adjustment upon an adjustable mount.

9. The method of measuring the velocity of a material comprising the steps of; making a hologram of effectively stationary material in a test zone, illuminating the hologram to reconstruct the wavefront to form an image of the effectively stationary material, initiating the motion of material through said zone, superposing said image on said material in the test zone whereby the wavefront therefrom and the reconstructed wavefront interfere, and measuring the frequency difference of the respective wavefronts.